United States Patent [19]
Kojima et al.

[11] Patent Number: 6,101,340
[45] Date of Patent: Aug. 8, 2000

[54] CAMERA HAVING FILM CARTRIDGE CHAMBER COVER WITH SAFETY LOCKING MECHANISM

[75] Inventors: Kazuhiko Kojima, Kyoto; Katsuhiro Ono, Sakai; Junichi Tanii, Izumi; Ikushi Nakamura, Sakai, all of Japan

[73] Assignee: Minolta Co., Ltd., Osaka, Japan

[21] Appl. No.: 09/081,225

[22] Filed: May 20, 1998

[30] Foreign Application Priority Data

May 21, 1997 [JP] Japan ................................. 9-130871

[51] Int. Cl.⁷ .................................................... G03B 17/24
[52] U.S. Cl. .......................................... 396/536; 396/538
[58] Field of Search .................................. 396/535, 536, 396/538

[56] References Cited

U.S. PATENT DOCUMENTS 5,475,454  12/1995  Ezawa .
5,481,325   1/1996  Wada et al. .
5,587,757  12/1996  Seamans et al. .................... 396/536

FOREIGN PATENT DOCUMENTS 54-128732  5/1979  Japan .
55-46732   2/1980  Japan .

*Primary Examiner*—David M. Gray
*Attorney, Agent, or Firm*—McDermott, Will & Emery

[57] ABSTRACT

A structure for transmitting a driving force from a camera body side to a cartridge chamber cover side in order to automatically operate a safety mechanism section of a safety locking mechanism installed inside the cover. The safety locking mechanism includes a locking mechanism section for locking the cover relative to the camera body; an unlocking operation member for manually releasing the locking mechanism section; and a safety mechanism section for selectively prohibiting or permitting the operation of the unlocking operation member. The driving force for automatically operating the safety mechanism section is transmitted from the camera body to the safety mechanism section through a winding spool of a film cartridge loaded inside the camera body.

17 Claims, 12 Drawing Sheets

CAMERA HAVING FILM CARTRIDGE CHAMBER COVER WITH SAFETY LOCKING MECHANISM

This application is based upon application No. 9-130871 filed in Japan, the contents of which are hereby incorporated by reference.

BACKGROUND OF THE INVENTION

1. Field of the Invention

The present invention generally relates to a camera having a safety locking mechanism of a film cartridge chamber cover (hereinafter referred to as a cartridge cover). More particularly, the present invention relates to the camera having the safety locking mechanism which is of a type using a film cartridge so constructed that a film thereof is fed out by a thrust mechanism inside a body of the camera.

2. Description of the Related Arts

Generally, a camera has a locking mechanism for locking a cartridge cover relative to a camera body. The locking mechanism keeps the cartridge cover closed after a film cartridge is loaded into the camera body, thus preventing the cartridge cover from being carelessly opened. A user can open the cartridge cover by manually operating an unlocking operation member for releasing the locking mechanism when the user desires to take out the film cartridge from the camera body.

If the user carelessly opens the cartridge cover with the film being out from the film cartridge which is set inside the camera body, a part of the film is exposed to light, and the valuable film already photographed may become useless. In order to avoid such a problem, there has been conventionally provided a locking mechanism (namely, a safety locking mechanism) which has a safety mechanism section for preventing the cartridge cover from being unlocked even though the user operates the unlocking operation member under such a situation in which the film is pulled out from the film cartridge which is set in the camera body.

On the other hand, as a camera system for facilitating miniaturization of a camera and for making loading of the film easy, there has been proposed a camera system using a film cartridge which is of a type in which the film is fed out by a thrust mechanism mounted on a side of a camera body. This type of film cartridge is so constructed that the film is accommodated inside the film cartridge up to a leader of the film therein when it is not loaded inside the camera body, and that the film is fed out from the film cartridge and is wound around a winding spool by a film feeding mechanism of the camera, once it is loaded inside the camera body.

As a safety locking mechanism of the camera using this type of film cartridge, a mechanism, for example, which is disclosed in U.S. Pat. No. 5,481,325, has been known. This safety locking mechanism is arranged on a bottom part, beside the cartridge chamber, of the camera body. Generally, this location of the safety locking mechanism corresponds to a location which is to be occupied by various mechanisms such as a transmission mechanism for winding and rewinding the film, a lens driving mechanism, and a shutter driving mechanism. Therefore, a more preferable location of the safety locking mechanism is desired in view of the miniaturization, of the camera, which is realized by saving a space inside the camera body, or in view of increase in degree of freedom for designing the camera.

Needless to say, the safety mechanism section of the safety locking mechanism should operate automatically, independent of the user's intention. Therefore, there is a need of contriving how a driving force should be transmitted to the safety mechanism section, including a consideration of its location.

SUMMARY OF THE INVENTION

Accordingly, it is an object of the present invention to provide a camera with a safety locking mechanism the arrangement and structure of which least interferes an arrangement of other components and mechanisms.

It is another object of the present invention to provide the camera with the safety locking mechanism the arrangement and structure of which is effective to automatically operate the same mechanism by transmitting a driving force thereto.

In accomplishing these and other objects of the present invention, in one aspect thereof, there is provided a camera with a cartridge chamber in which a film cartridge is housed, comprising: a cover for opening and closing the cartridge chamber; a locking mechanism for locking the cover relative to a body of the camera at a position at which the cover closes the cartridge chamber; a manual unlocking member for operating the locking mechanism so as to unlock the cover relative to the body; a safety mechanism for permitting and prohibiting an operation of the manual unlocking member, wherein the safety mechanism is provided on a side of the cover; a driving source for supplying a force to drive the safety mechanism; and a transmission mechanism for transmitting the force from the driving source to the safety mechanism.

According to the mechanism, the safety mechanism constituting the safety locking mechanism is provided on the cover side, for example inside the cover, but not on the body side, of the camera. Therefore, the safety mechanism does not interfere an arrangement of other components or mechanisms, such as a transmission mechanism, lens driving mechanism, shutter driving mechanism, of the camera. Namely, the arrangement of the safety mechanism is advantageous in respect of a miniaturization of camera, and/or in respect of increment in degree of freedom for designing the camera.

The locking mechanism may comprise a locking part which is movable between a projecting position at which the locking part projects from the cover and a withdrawing position at which the locking part withdraws inside the cover.

According to the mechanism, when the locking part is at the projecting position, the locking part projects from the cover to engage a part of the body of the camera, thus locking the cover relative to the body of the camera. Meanwhile, when the locking part is at the withdrawing position, the locking part withdraws to the cover to disengage from the part of the body of the camera, thus unlocking the cover from the body thereof.

In the mechanism, it is preferable that the locking mechanism further comprises a prohibiting mechanism for prohibiting an operation of the safety mechanism, for example so as to keep permitting the operation of the manual unlocking member, when the cartridge chamber is not loaded with the film cartridge.

According to the mechanism, for example, a situation in which it is impossible to unlock the cover from the camera body in case that the cover is closed with the film cartridge being unloaded inside the camera body, and in case that the safety mechanism is carelessly operated or actuated by a vibration and impulse for example, is surely prevented. In other words, a situation in which it is impossible to open the cover when the user wants to set the film cartridge therein, is surely prevented.

In the mechanism, the prohibiting mechanism may comprise a contact member which projects inside the cartridge chamber and which contacts the film cartridge which is set inside the cartridge chamber.

In the mechanism, the contact member may be a member constituting one of the safety mechanism and the transmission mechanism, in which the contact member may engage a stationary part of the cover of the camera when the cartridge chamber is not loaded with the film cartridge.

In the mechanism, the contact member may contact the film cartridge so that the contact member moves and disengages from the stationary part of the cover when the cartridge chamber is loaded with the film cartridge.

In another aspect of the present invention, there is provided a camera with a cartridge chamber in which a film cartridge is housed, comprising: a cover for opening and closing the cartridge chamber; a locking mechanism for locking the cover relative to a body of the camera at a position at which the cover closes the cartridge chamber; a manual unlocking member for operating the locking mechanism so as to unlock the cover relative the body; a safety mechanism for permitting and prohibiting an operation of the manual unlocking member, wherein the safety mechanism is provided on a side of the cover; a driving source for supplying a force to drive the safety mechanism; and a transmission mechanism for transmitting the force from the driving source to the safety mechanism via a spool of the film cartridge set inside the cartridge chamber.

According to the mechanism, the safety mechanism is arranged on the cover side, for example, inside the cover, but not on the body side. Therefore, the arrangement is advantageous in respect of a miniaturization of camera, and/or in respect of increment in degree of freedom for designing the camera, as well.

Also, according to the mechanism, when the cover is closed with the cartridge chamber being loaded with the film cartridge, the cover is adjacent to the film cartridge. Therefore, by transmitting the force from the driving source to the safety mechanism via the spool of the film cartridge set inside the cartridge chamber, it is possible to automatically operate or actuate the safety mechanism which is provided on the side of the cover having a high independence relative to the camera body, in which the cover is, for example, hinged to the camera body by using a pin.

In the mechanism, the locking mechanism may comprise a locking part which is movable between a projecting position at which the locking part projects from the cover and a withdrawing position at which the locking part withdraws inside the cover.

In the mechanism, the transmission may further comprises: a driving member which is interlocked with the driving source and which engages one of two edges of the spool of the film cartridge; and a driven member which is interlocked with the safety mechanism and which engages the other of two edges thereof.

In the mechanism, it is preferable that the safety mechanism is drive so as to permit the operation of the manual unlocking member, when the spool of the film cartridge is rotated in a direction in which a film is rewound inside the film cartridge by the transmission mechanism.

According to the mechanism, for example, when the rewinding of the film inside the film cartridge finishes, the safety mechanism permits the operation of the manual unlocking member, thus possible to open the cover.

Also, in the mechanism, it is preferable that the safety mechanism is driven so as to prohibit the operation of the manual unlocking member, when the spool of the film cartridge is rotated in a direction in which a film is fed out from the film cartridge by the transmission mechanism.

According to the mechanism, for example, when the feeding out of the film from the film cartridge finishes, the safety mechanism prohibits the operation of the manual unlocking member, thus making it impossible to open the cover.

In the mechanism, it is preferable that the transmission mechanism further comprises a pair of members which frictionally engage each other, and wherein a rotation of the spool of the film cartridge is permitted during and after an operation of the safety mechanism.

In the mechanism, it is preferable that there is further provided a prohibiting mechanism for prohibiting an operation of the safety mechanism when the cartridge chamber is not loaded with the film cartridge.

In the mechanism, the prohibiting mechanism may comprise a contact member which projects inside the cartridge chamber and which contacts the film cartridge which is set inside the cartridge chamber.

In the mechanism, the contact member may be a member constituting one of the safety mechanism and the transmission mechanism, and wherein the contact member engages a stationary part of the cover of the camera when the cartridge chamber is not loaded with the film cartridge.

In the mechanism, the contact member may contact the film cartridge so that the contact member moves and disengages from the stationary part of the cover when the cartridge chamber is loaded with the film cartridge.

BRIEF DESCRIPTION OF THE DRAWINGS

These and other objects and features of the present invention will become clear from the following description taken in conjunction with a preferred embodiment thereof with reference to the accompanying drawings, in which.

DETAILED DESCRIPTION OF THE PREFERRED EMBODIMENT

Figure 1:
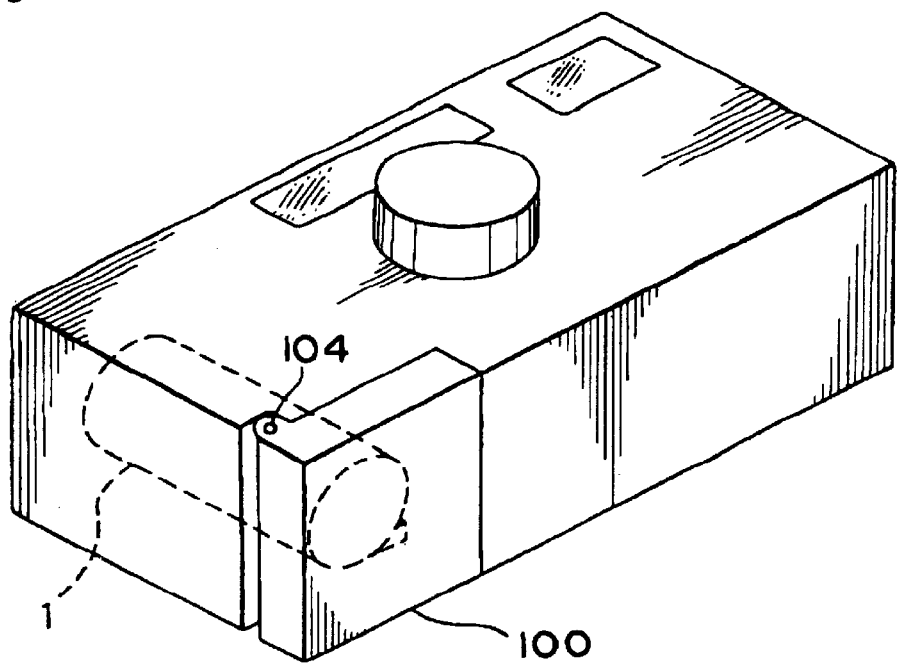
FIG. 1 is a perspective view showing a bottom surface of a camera according to a preferred embodiment of the present invention.

Before a description of the embodiment proceeds, it is to be noted that like or corresponding parts are designated by like reference numerals throughout the accompanying drawings.

Referring to FIGS. 1 through 15, the detailed description is made below on a camera according to a preferred embodiment of the present invention.

In the camera of the embodiment, a film cartridge chamber cover 100 (hereinafter referred to as a cartridge cover 100) is constituted as a cartridge chamber cover unit incorporating a safety locking mechanism. The safety locking mechanism has a locking mechanism section for locking the cartridge cover 100 relative to a camera body; an unlocking operation member 90 for manually unlocking or releasing the locking mechanism section; and a safety mechanism section for selectively prohibiting and permitting the operation of the unlocking operation member 90.

Figure 2:
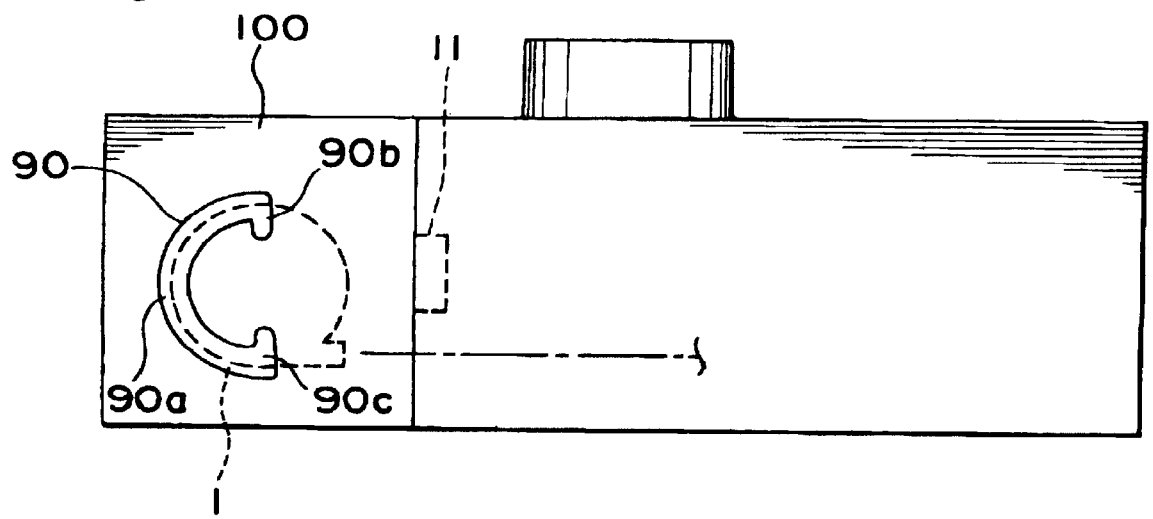
FIG. 2 is a bottom view of the camera shown in FIG. 1.

FIG. 1 is a perspective view showing the camera from a bottom side thereof, and FIG. 2 is a bottom view showing the camera of FIG. 1. The cartridge cover 100 is rotatably connected to a side of lower surface of the camera body by a hinge connection part 104. The cartridge cover 100 can be opened by rotating it towards a lower side of the camera body, namely downwards, about the hinge connection part 104. As shown in FIG. 2, the unlocking operation member 90 is arranged on an outer surface of the cartridge cover 100. As will be described later, the unlocking operation member 90 is a member for manually unlocking the cartridge cover 100 relative to the camera body.

Figure 3:
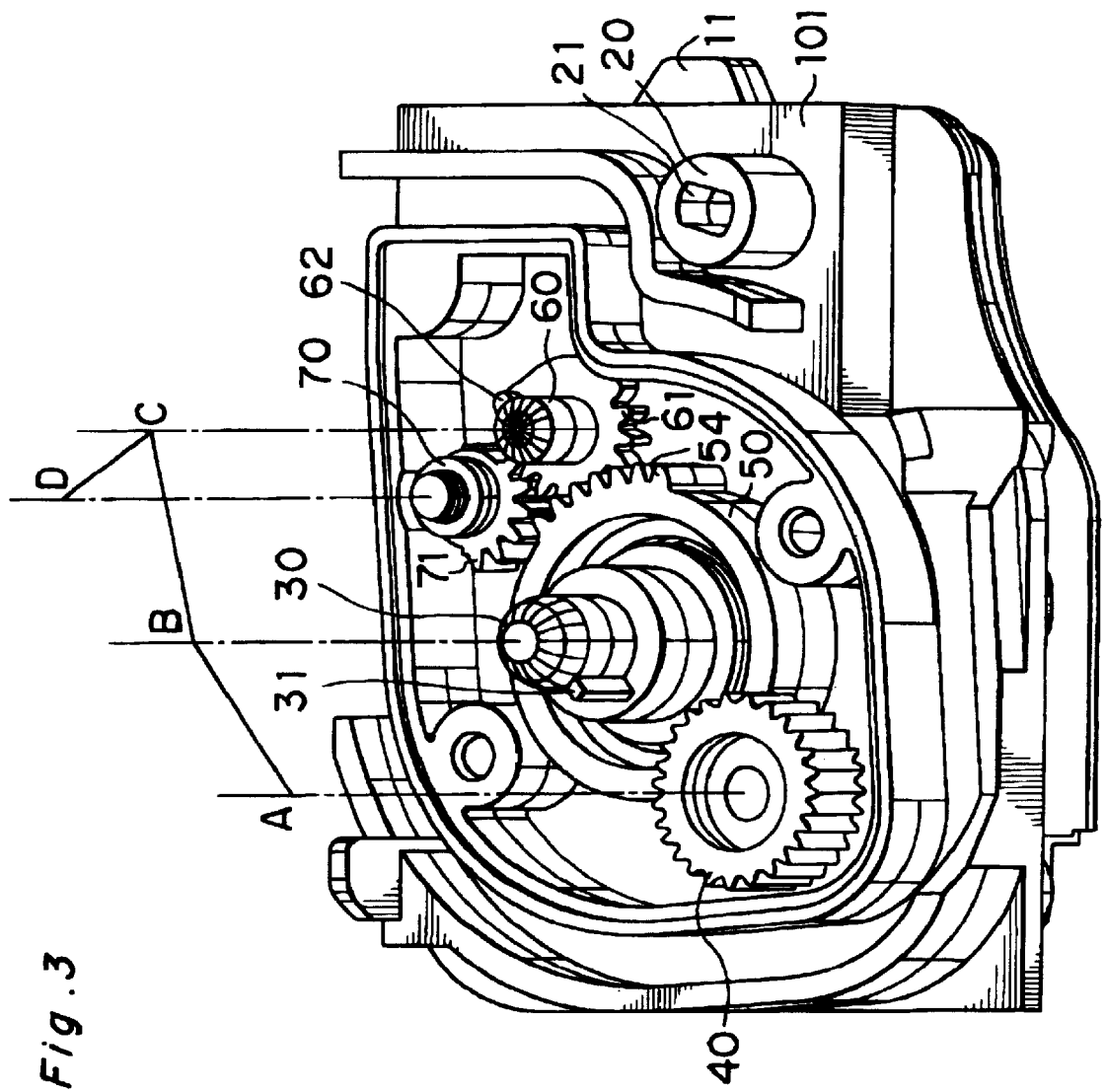
FIG. 3 is a perspective view showing a main part of a safety mechanism section provided inside a film cartridge chamber cover of the camera shown in FIG. 1.
Figure 4:
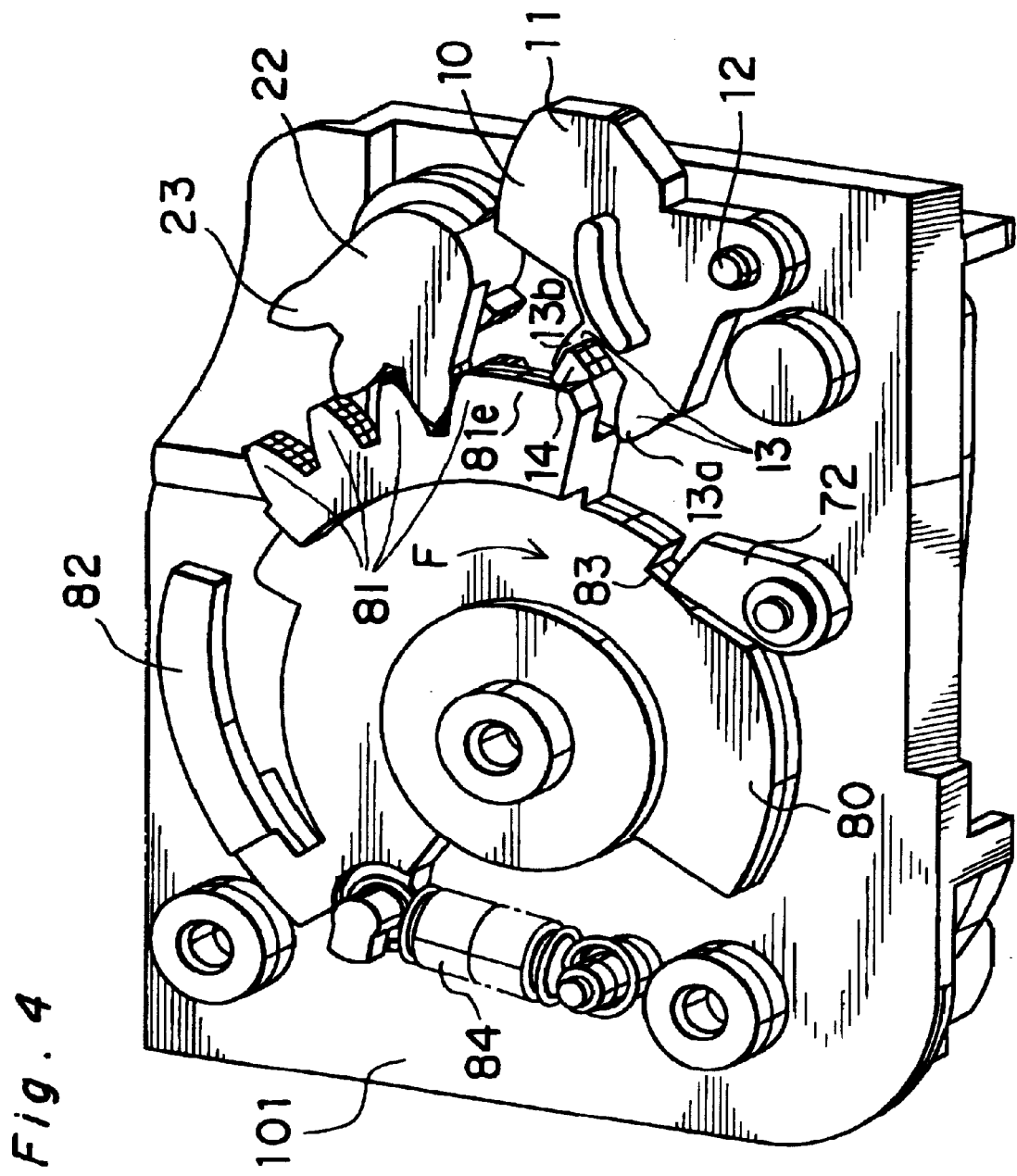
FIG. 4 is a perspective view showing a locking mechanism section provided inside the film cartridge chamber cover of the camera shown in FIG. 1.
Figure 5:
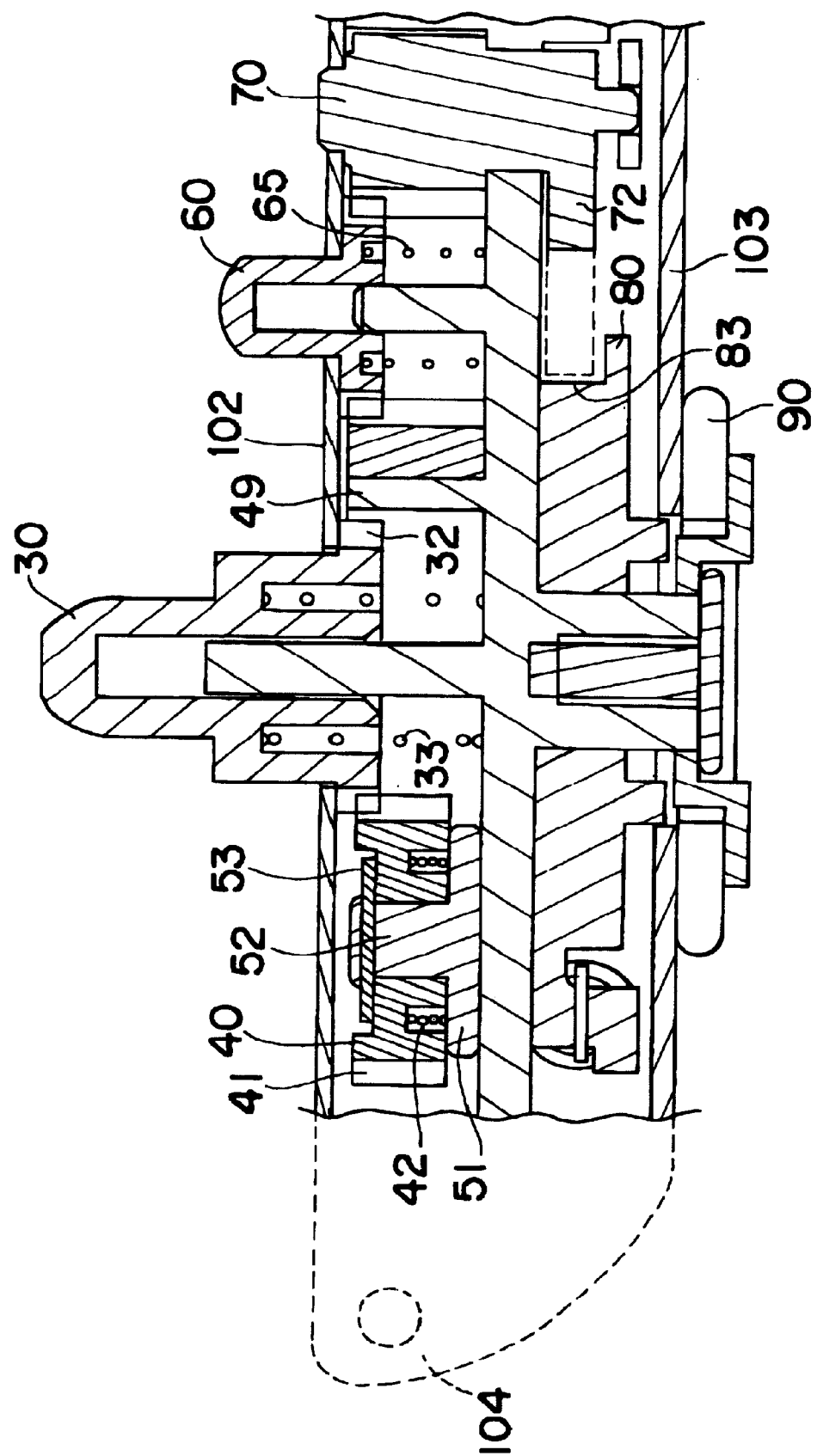
FIG. 5 is a sectional view taken along a line A-B-C-D of FIG. 3.

FIGS. 3 through 5 show the safety mechanism section and the locking mechanism section. The cartridge cover 100 has a base 101; a main part of the safety mechanism section on a side of upper surface of the base 101; the locking mechanism section on a side of lower surface of the base 101; a cover member 102 for covering the safety mechanism section; and a cover member 103 for covering the locking mechanism section. FIG. 3 shows the cartridge cover 100 with the cover 102 being removed; more specifically, it is a perspective view showing the base 101 from its upper side. FIG. 4 shows the cartridge cover 100 with the cover 103 being removed; more specifically, it is a perspective view showing the base 101 from its rear side (or back side). FIG. 5 is a sectional view taken along a line A-B-C-D of FIG. 3. FIG. 5 shows the cartridge cover 100 in which the cover members 102 and 103 are mounted relative to the base 101.

The locking mechanism section is positioned on the lower surface of the base 101. The main constituent elements of the locking mechanism section are a locking gear 80, a locking lever 10, and a locking gear urging spring 84. In the state shown in FIGS. 3 and 4, a locking portion 11 of the locking lever 10 projects from an edge of the cartridge cover 100. The locking portion 11 thereof can engage an engaging part of the camera body, thus locking the cartridge cover 100 relative to the camera body (see FIG. 2). When the unlocking operation member 90 positioned on the outer surface of the cartridge cover 100 is operated to rotate the locking gear 80 in a direction shown by an arrow "F" as shown in FIG. 4, the locking portion 11 retreats or withdraws into the cartridge cover 100, thus being able to unlock or release the cartridge cover 100 from the camera body.

The construction of the unlocking operation member 90 is not limited to a specific construction. In the example shown in FIG. 2, the unlocking operation member 90 is constituted by an approximately C-shaped curved portion 90a, and a pair of linear engaging portions 90b, 90c provided at both ends of the curved portion 90a (see FIG. 2). The unlocking operation member 90 is rotatably mounted on the outer surface of the cartridge cover 100 about the linear engaging portions 90b, 90c. That is, a whole of the unlocking operation member 90 lies or extends along the surface of the cartridge cover 100 when it is not used. On the other hand, at time of performing an unlocking operation, the unlocking operation member 90 can be raised or erected from the surface of the cartridge cover 100, and the curved portion 90a can be rotated by fingers pinching the curved portion 90a. When the locking gear 80 rotates in unison with the rotation of the curved portion 90a, the locking portion 11 withdraws into the cartridge cover 100, and its locking state of the cartridge cover 100 relative to the camera body is released (namely, the cartridge cover 100 is unlocked from the camera body), as will be described later.

Figure 6:
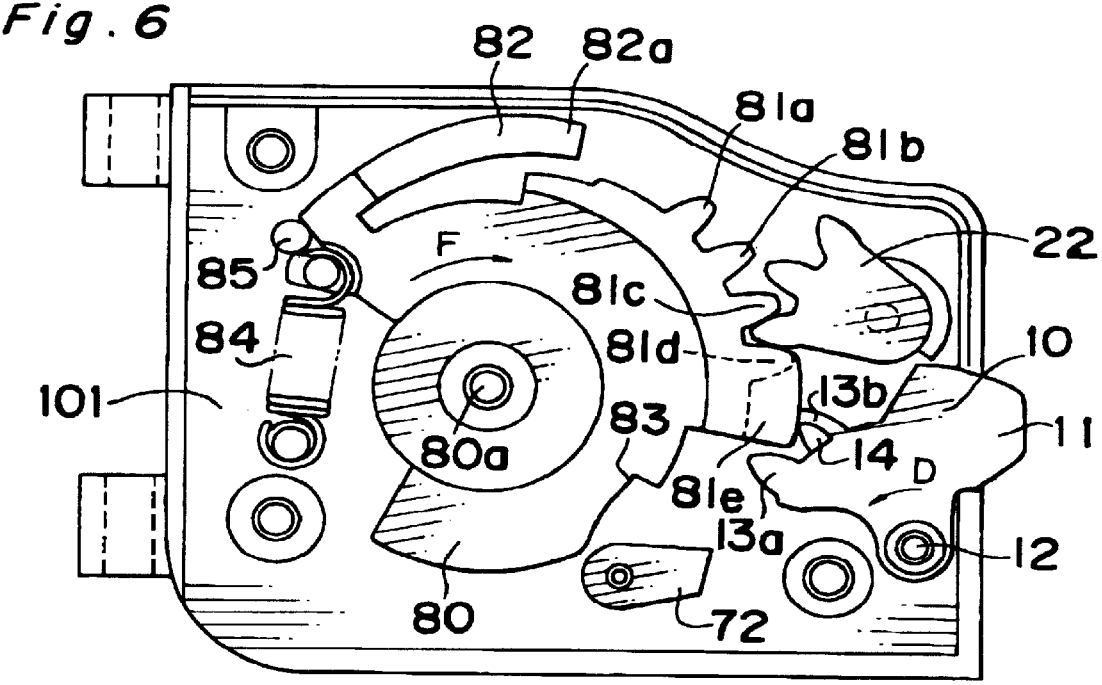
FIG. 6 is an explanatory view for explaining an operation of the locking mechanism section of FIG. 4.
Figure 7:
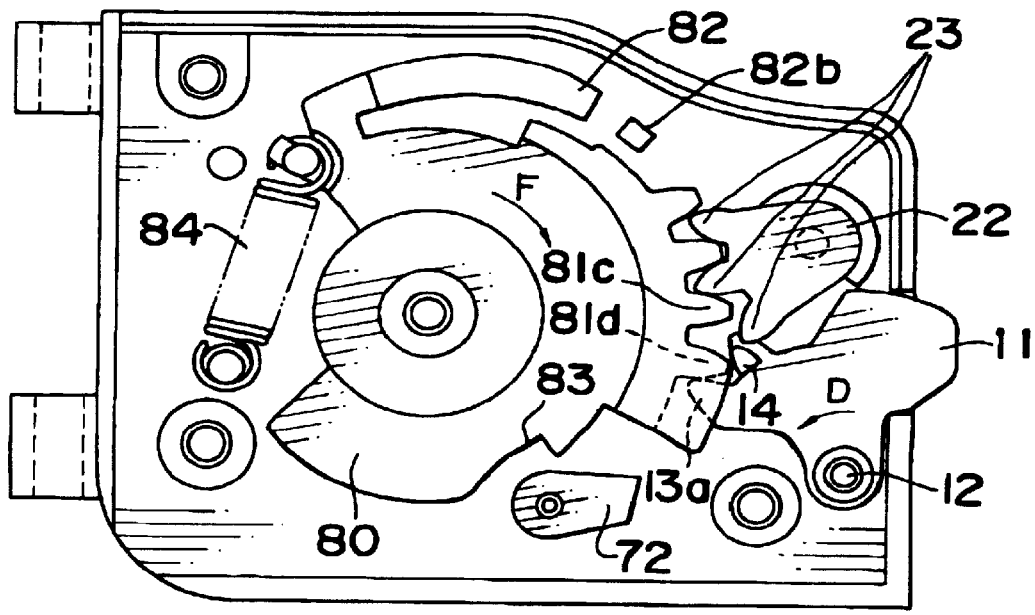
FIG. 7 is an explanatory view for explaining the operation of the locking mechanism section of FIG. 4.
Figure 8:
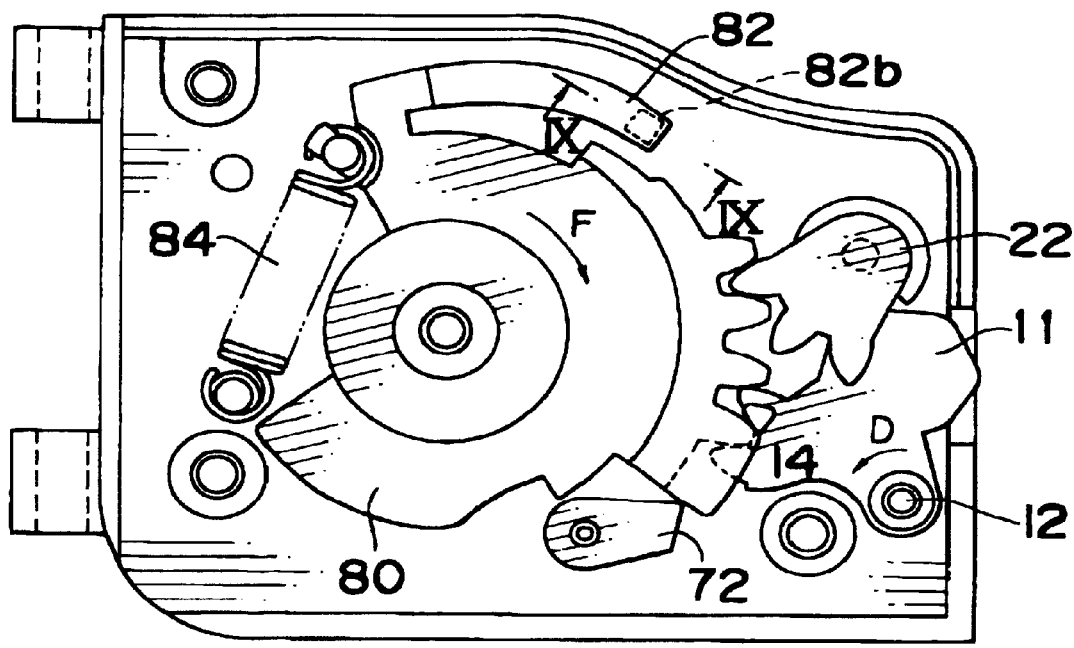
FIG. 8 is an explanatory view for explaining the operation of the locking mechanism section of FIG. 4.

Referring to FIGS. 6 through 8, it is explained below about an operation of unlocking the cartridge cover 100 from the camera body, by manually operating the unlocking operation member 90 so that the projected locking portion 11 withdraws into the cartridge cover 100.

FIGS. 6 through 8 show the rear surface (or back surface) of the cartridge cover 100 with the cover member 103 thereof being removed. It is to be noted that in the state shown in FIG. 4, the safety mechanism, which will be described later, functions, so that the cartridge cover 100 cannot be unlocked from the camera body even if the unlocking operation member is operated. On the other hand, in the state shown in FIG. 6, the safety mechanism does not function (i.e. the safety mechanism is released), so that the cartridge cover 100 can be unlocked from the camera body by operating the unlocking operation member 90.

The locking gear 80 is rotatable on its axis 80a between a locking position shown in FIG. 6 and an unlocking position shown in FIG. 8. The locking gear 80 is urged (i.e. biased) by a spring 84 in a direction opposite to a direction shown by an arrow "F" in FIG. 6. A stopper 85 is erected on the base 101 so that the locking gear 80 is prevented from rotating counterclockwise beyond the locking position shown in FIG. 6, because the locking gear 80 contacts the stopper 85. Namely, the spring 84 urges the locking gear 80 toward the locking position.

The locking lever 10 is pivotal on a shaft 12. Interlocking with the rotation of the locking lever 10, the locking portion 11 projects from the edge of the cartridge cover 100 and withdraws into the cartridge cover 100. When the locking portion 11 is in a state in which it is projected from the edge of the cartridge cover 100, the locking portion 11 engages a part of the camera body, more specifically engages a housing section constituting a rear surface of the camera body, thus locking the cartridge cover 100 relative to the housing section (see FIG. 2).

The locking lever 10 has a partial gear portion 13 with a pair of teeth 13a, 13b formed thereon. A locking stopper 14 is formed on an upper surface of the tooth 13b. In a state shown in FIG. 6, the locking stopper 14 is in contact with a contact locking portion 81e of the locking gear 80 which will be described later, thus preventing the locking lever 10 from rotating in a direction shown by an arrow D in the figure. That is, the locking portion 11 of the locking lever 10 is prevented from withdrawing into the cartridge cover 100. In this state, the cartridge cover 100 cannot be opened.

The locking gear 80 has a gear portion 81 with four teeth 81a, 81b, 81c, and 81d formed thereon. The gear portion 81 engages the gear portion 13 of the locking lever 10. The gear portion 81 of the locking gear 80 also engages a light-intercepting door operation gear 22 for opening and closing a light-intercepting door of the film cartridge. The engagement between the gear portion 81 of the locking gear 80 and the light-intercepting door operation gear 22 will be described in detail later.

As shown in FIGS. 4 through 6, of the four teeth 81a, 81b, 81c, 81d constituting the gear portion 81 of the locking gear 80, the tooth 81d positioned in foremost of these teeth 81a, 81b, 81c, 81d relative to a direction shown by the arrow "F", has a lower half in a direction of its thickness constructed as a tooth, and an upper half in the direction thereof constructed as a contact locking portion 81e extending in a circumferential direction of the locking gear 80. As described above, the contact locking portion 81e prevents the locking portion 11 from withdrawing into the cartridge cover 100.

When the unlocking operation member 90 is operated from the state shown in FIG. 6 to rotate the locking gear 80 in the direction shown by the arrow "F", the tooth 81d of the locking gear 80 engages the tooth 13a of the locking lever 10, and the locking stopper 14 of the locking lever 10 in contact with the contact locking portion 81e of the locking gear 80 comes to a position (this state is shown in FIG. 7) corresponding to a valley formed between the teeth 81c, 81d. That is, when the locking gear 80 is rotated further in the direction shown by the arrow "F" from the state shown in FIG. 7, a driving force acts on the locking lever 10 in a direction shown by an arrow "D" by the engagement between the gear portion 81 of the locking gear 80, and the gear portion 13 of the locking lever 10. At this time, the locking stopper 14 is no longer in contact with the contact locking portion 81e; namely, no member or portion prevents the movement of the locking stopper 14. Therefore, the rotation of the locking lever 10 in the direction shown by the arrow "D" is permitted, thus allowing the locking portion 11 to withdraw into the cartridge cover 100 (this state is shown in FIG. 8).

When the locking gear 80 is rotated to the position shown in FIG. 8 from the position shown in FIG. 6, a front end 82a of a circular arc-shaped arm portion 82 formed on the locking gear 80 engages an open portion 82b formed on the base 101, thus fixing the locking gear 80 relative to the base 101 at the position shown in FIG. 8.

Figure 9:
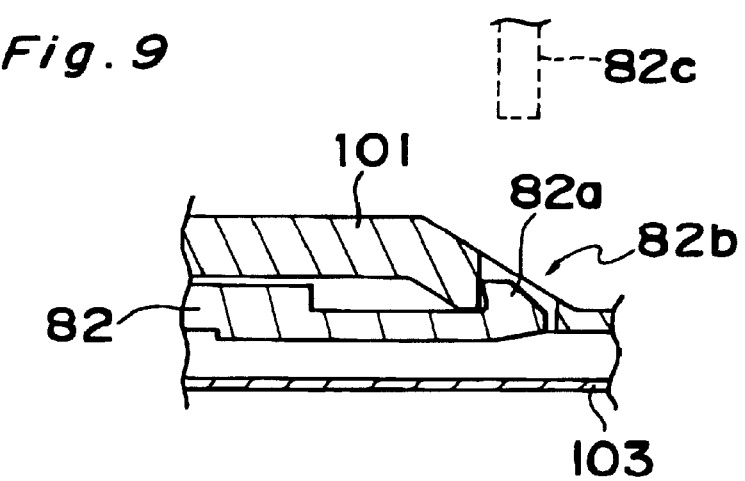
FIG. 9 is a sectional view taken along a line IX—IX of FIG. 8.

The section taken along a line IX—IX of FIG. 8 is shown in FIG. 9. Referring to FIG. 9, when the locking gear 80 rotates and comes to the position shown in FIG. 8, the arm portion 82 of the locking gear 80 approaches the open portion 82b from the left hand side in the figure, and a hook-shaped front end 82a of the arm portion 82 engages the open portion 82b, with the front end 82a being elastically deformed. Accordingly, when the locking gear 80 is rotated to the position shown in FIG. 8 from the position shown in FIG. 6 by rotating the unlocking operation member 90 to open the cartridge cover 100, the unlocking state of the cartridge cover 100 is maintained by the engagement between the front end 82a and the open portion 82b.

On the other hand, when the cartridge cover 100 is closed, a projection 82c (see FIG. 9) formed on the side of the camera body presses the front end 82a, thus disengaging the front end 82a and the open portion 82b from each other. At this time, the locking gear 80 is returned back to the locking portion shown in FIG. 6 by the action of the spring 84. That is, as long as the unlocking operation member 90 is not operated, the locking state of the cartridge cover 100 relative to the camera body is maintained.

The light-intercepting door is installed on the film cartridge which is operated by a thrust mechanism provided inside the camera body. This type of film cartridge is so constructed that a film is completely accommodated in a case of the film cartridge before the film cartridge is used, and that the film is fed out from the cartridge after the light-intercepting door is opened. After the film being fed out from the cartridge in the camera body is entirely rewound inside the cartridge, it is necessary that the light-intercepting door is closed before the cartridge cover 100 is opened. Therefore, in the camera of the embodiment, a mechanism for opening and closing the light-intercepting door of the cartridge in unison with the rotation of the locking gear 80 of the locking mechanism section is adopted. The mechanism will be described below.

As shown in FIGS. 6 through 8, the gear portion 81 of the locking gear 80 of the locking mechanism section is also in engagement with the light-intercepting door operation gear 22 as well as the gear portion 13 of the locking lever 10. The light-intercepting door operation gear 22 has a partial gear portion 23 with three teeth, and rotates within a region between an opening position shown in FIG. 6 and a closing position shown in FIG. 8 in unison with the rotation of the locking gear 80. The light-intercepting door operation gear 22 is fixed to a shaft member 20 (see FIG. 3) which penetrates through the base 101 of the cartridge cover 100 so as to extend over the upper surface of the base 101. That is, the shaft member 20 rotates together with the light-intercepting door operation gear 22.

Figure 10:
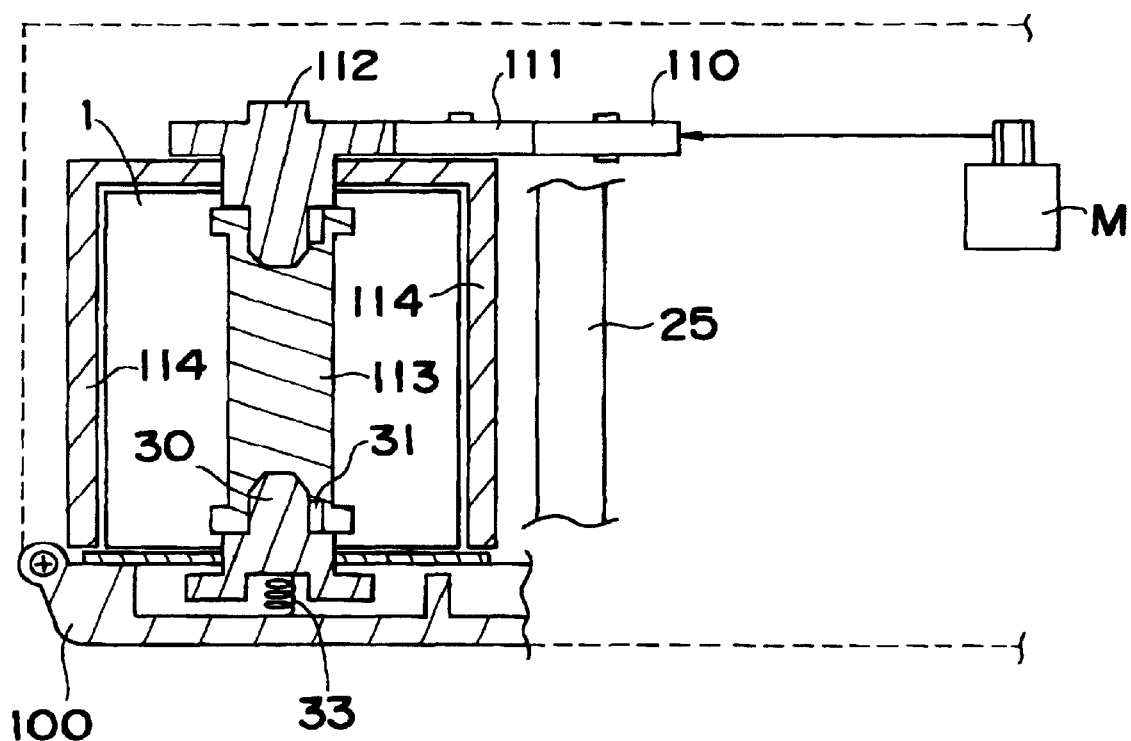
FIG. 10 is an explanatory sectional view for explaining a principle of how a driving force is transmitted from a body of the camera shown in FIG. 1 to the safety mechanism section via a spool of a film cartridge which is set inside the body of the camera.

As shown in FIG. 3, a rectangular engaging hole 21 is formed on an upper surface of the shaft member 20 on a side of the upper surface of the base 101. A linear light-intercepting door operation shaft 25 (see FIG. 10) extending up to a vicinity of an upper surface of the camera body engages the engaging hole 21. As shown in FIG. 10, the light-intercepting door operation shaft 25 extends towards the vicinity of the upper surface of the camera body, adjacent to a side of a cartridge chamber wall 114 arranged inside the camera body. The upper end of the light-intercepting door operation shaft 25 is of access to an upper side surface of the cartridge 1 through a gear train (not shown). The light-intercepting door operation shaft 25 opens and closes the light-intercepting door (not shown) in unison with the rotation of the light-intercepting door operation gear 22.

As described above, it is possible to unlock the cartridge cover 100 from the camera body by manually operating the unlocking operation member 90. However, in the state in which the film is fed out from the film cartridge which is loaded in the camera body, a portion of the film being fed out is exposed to light when the cartridge cover 100 is opened. In order to prevent this careless exposure of the film to light, there is provided a safety mechanism section for making it impossible to unlock the cartridge cover 100 from the camera body when the unlocking operation member 90 is erroneously operated. Next, it is explained on the safety mechanism section below.

As explained above, in the state shown in FIGS. 6 through 8, the safety mechanism section is released, and the cartridge cover 100 can be unlocked by manually operating the unlocking operation member 90 (hereinafter, this state is referred to as an "unlocking possible state"). This is because a safety lever 72 is not in engagement with a cut-out portion 83 formed on a side surface of the locking gear 80; therefore, the rotation of the locking gear 80 is not prohibited in the direction shown by the arrow "F".

On the other hand, in the state shown in FIG. 4, the safety lever 72 is in engagement with the cut-out portion 83 formed on the side surface of the locking gear 80. Thus, the rotation of the locking gear 80 in the direction shown by the arrow "F" is prohibited. That is, the state shown in FIG. 4 is the state in which the safety mechanism section functions. Thus, in this state, even if the unlocking operation member 90 is operated, the cartridge cover 100 cannot be opened (hereinafter, this state is referred to as an "unlocking impossible state").

In other words, the state that the safety mechanism section functions is the state that the safety lever 72 is in engagement with the cut-out portion 83 formed on the side surface of the locking gear 80. Meanwhile, the state that the safety mechanism section does not function is the state that the safety lever 72 is away from the cut-out portion 83 formed on the side surface of the locking gear 80.

In the embodiment, the safety locking mechanism is incorporated in the cartridge cover 100. The cartridge cover 100 is connected with the camera body at the hinge connection part 104 only (see FIGS. 1 and 5), and is independent of the camera body to a high degree.

Next, it is explained about how a driving force is transmitted from a side of the camera body to the safety mechanism section of the safety locking mechanism which is incorporated inside the cartridge cover 100.

In the embodiment, the driving force for rotating the spool of the film cartridge is transmitted from the camera body to the safety mechanism section by connecting the spool of the film cartridge and one of the gears constituting the safety mechanism section with each other.

FIG. 10 is a sectional explanatory view for explaining a transmission mechanism for transmitting the driving force from the side of the camera body to the safety mechanism section. The broken line shown in FIG. 10 shows an outline of the camera body. The driving force of a driving motor "M" located at a predetermined position, for example inside a winding spool, in the camera body, is transmitted to a winding spool 113 positioned inside the film cartridge 1 through a plurality of gear trains 110, 111, and 112 so that the film is wound and rewound. When the cartridge cover 100 is closed, a spool engaging gear 30 which is a constituent element of the safety mechanism section of the safety locking mechanism, engages the spool 113 of the film cartridge 1, thus transmitting the driving force of the driving motor "M" to the safety mechanism section. A key 31 for securing the engagement between the spool 113 and the spool engaging gear 30 is provided on a shaft portion of the spool engaging gear 30. As shown in FIG. 10, the spool engaging gear 30 is urged upward by a spring 33 so that the spool 113 is fixed in its vertical direction.

There may occur a situation in which the rotational phase of the spool 113 and that of the gear 112, or the rotational phase of the spool 113 and that of the spool engaging gear 30, are not coincident with each other immediately after the cartridge is loaded in the camera body and then the cartridge cover 100 is closed. In such a situation, the spool 113 and the gear 112, or the spool 113 and the spool engaging gear 30 may not engage each other completely. The spring 33 also has a function to allow them to engage each other completely when the rotational phases thereof are coincident with each other immediately after the driving motor "M" starts to rotate.

Figure 11:
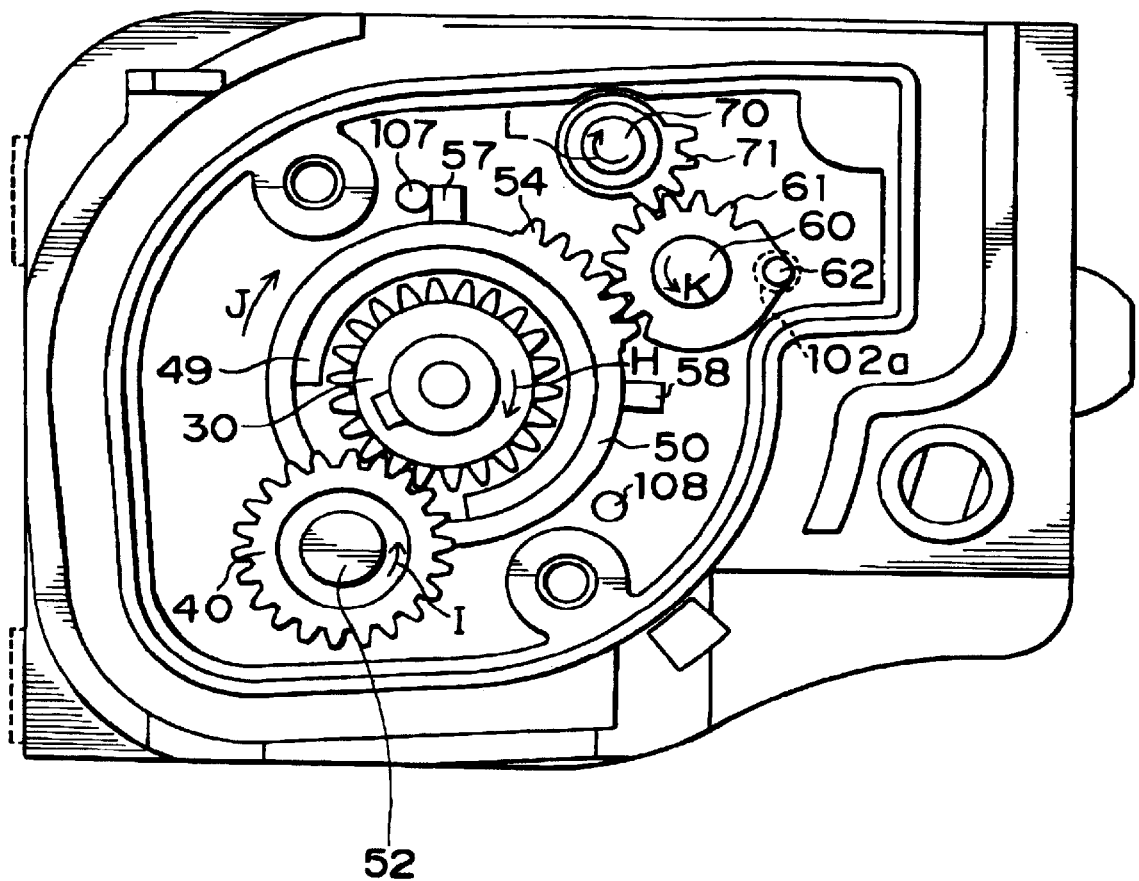
FIG. 11 is a plan view showing a state in which a planetary carrier of the safety mechanism section of FIG. 3 is located at a first position.

With reference to FIGS. 3, 5, and 11, the entire mechanism of the safety mechanism section is described below.

A planetary carrier 50 is positioned concentrically with respect to the spool engaging gear 30. The planetary carrier 50 has a pedestal 51 (See FIG. 5. In FIGS. 3 and 11, the pedestal 51 is not shown because it is hidden under a planetary gear 40) which is provided on a peripheral portion of an annular body thereof, and has a gear portion 54. As shown in FIG. 5, a supporting shaft 52 of the planetary gear 40 is erected on the pedestal 51. A circular pressing plate 53 is mounted proximate to an upper end of the supporting shaft 52. The planetary gear 40 is urged toward the pressing plate 53 by a spring 42 installed on a lower side of the planetary gear 40.

That is, the planetary gear 40 is rotatable on the supporting shaft 52. The rotation of the planetary gear 40 is not a perfect free rotation relative thereto, but the planetary gear 40 is frictionally rotatable relative thereto with a certain degree of frictional resistance exerting therebetween. The planetary carrier 50 is rotatable around the spool engaging gear 30 by a guidance of a cylindrical guide wall 49. The guide wall 49 is not perfectly cylindrical, but a part thereof is cut out so that the spool engaging gear 30 engages the planetary gear 40 in the cut-out portion, as is well shown in FIG. 11.

A pair of locking projections 57, 58 are formed on both sides of the gear portion 54, in a radial direction, of the annular body of the planetary carrier 50. Stoppers 107, 108 corresponding to the locking projections 57, 58 are erected on the base 101. That is, a rotatable range of the planetary carrier 50 relative to the base 101 is restricted by the locking projections 57, 58 and the stoppers 107, 108.

The gear portion 54 of the planetary carrier 50 engages the gear portion 61 of an intermediate gear 60. The gear portion 61 engages a gear portion 71 of a safety gear 70. As shown in FIG. 5, the safety gear 70 penetrates through the base 101, extends below the lower surface thereof, and is connected to a safety lever 72. That is, the safety lever 72 rotates in unison with the rotation of the safety gear 70.

Next, an operation of the safety mechanism section is described below.

Figure 12:
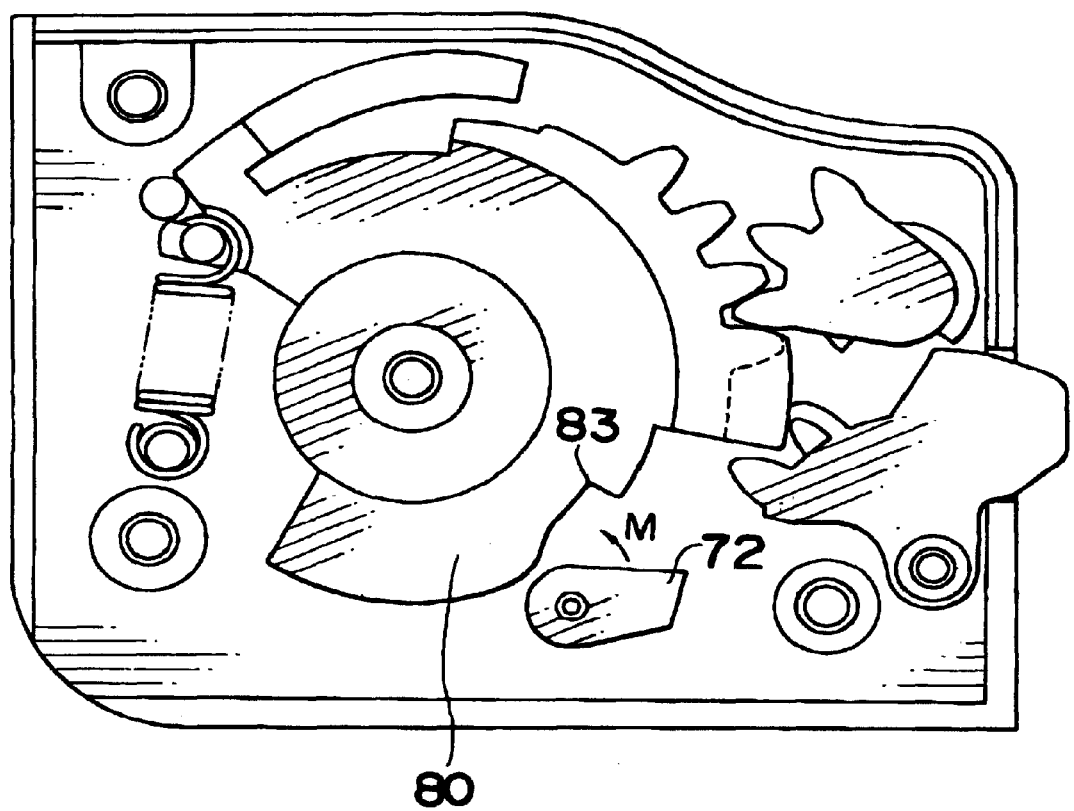
FIG. 12 is an explanatory view showing a position of a safety lever in the state of FIG. 11.

FIG. 11 shows the cartridge cover 100 with the cover member 102 being removed, in the unlocking possible state, which is viewed from an upper side thereof. FIG. 12 shows the cartridge cover 100 with the cover member 103 being removed, in the unlocking possible state, which is viewed from a lower side thereof. As described above, in the unlocking possible state, the safety lever 72 is away from the cut-out portion 83 formed on the side surface of the locking gear 80. Therefore, the cartridge cover 100 can be unlocked from the camera body by operating the unlocking operation member 90.

When the cartridge 1 is loaded into the camera body and the cartridge cover 100 is closed, the spool 113 of the cartridge 1 is driven in a film feeding direction by the driving motor (see FIG. 10) which is provided inside the camera body, thus rotating the spool engaging gear 30 in a direction shown by an arrow "H". As a result, a rotation driving force in a direction shown by an arrow "I" acts on the planetary gear 40 engaging the spool engaging gear 30. As described above, because the planetary gear 40 is in a frictional engagement with the supporting shaft 52 formed on the pedestal 51 of the planetary carrier 50, the planetary gear 40 rotates in a direction shown by the arrow "I" and the planetary carrier 50 rotates in a direction shown by an arrow "J", at this time. Namely, the planetary carrier 50 functioning as an interlocking rotation member is connected to the spool engaging gear 30 functioning as a spool engaging member through the planetary gear 40. With the mechanism, the planetary carrier 50 can be rotated in unison with the spool engaging gear 30.

As apparent from FIG. 11, when the planetary carrier 50 rotates in the "J" direction, the intermediate gear 60 rotates in a "K" direction and the safety gear 70 rotates in an "L" direction. When the safety gear 70 rotates in the "L" direction, the safety lever 72 connected therewith rotates in "M" direction as shown in FIG. 12. As a result, the safety lever 72 engages the cut-out portion 83 formed on the side surface of the locking gear 80, and it is located at the positioned shown in FIG. 14 (the position of the safety lever 72 at this time is shown by a broken line in FIG. 5).

As the film is fed out from the cartridge 1, the planetary carrier 50 rotates in the "J" direction. But the planetary carrier 50 cannot rotate further in the "J" direction when the locking projection 58 formed on the peripheral surface of the planetary carrier 50 contacts the stopper 108. It is possible to feed out the film from the cartridge 1 under this state. Namely, at this time, the planetary gear 40 continues rotating about the supporting shaft 52 against the frictional force exerting therebetween.

By the way, it is possible to directly frictionally connect a part corresponding to the spool engaging gear 30 and the planetary carrier 50 with each other with the planetary gear 40 being omitted. For example, it is possible to adopt a cylindrical member, not having a gear formed thereon, instead of the spool engaging gear 30, and to frictionally mount the planetary carrier 50 on the outer periphery of the cylindrical member.

Figure 13:
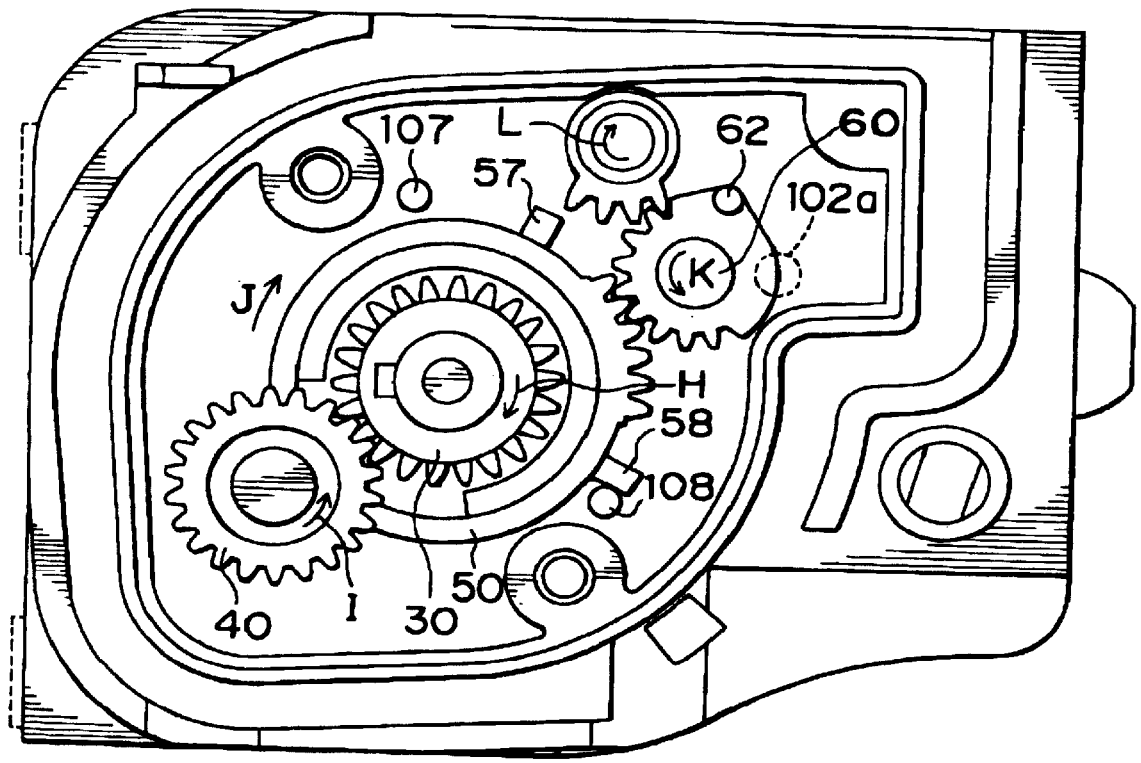
FIG. 13 is a plan view showing a state in which the planetary carrier of the safety mechanism section of FIG. 3 is located at a second position.
Figure 14:
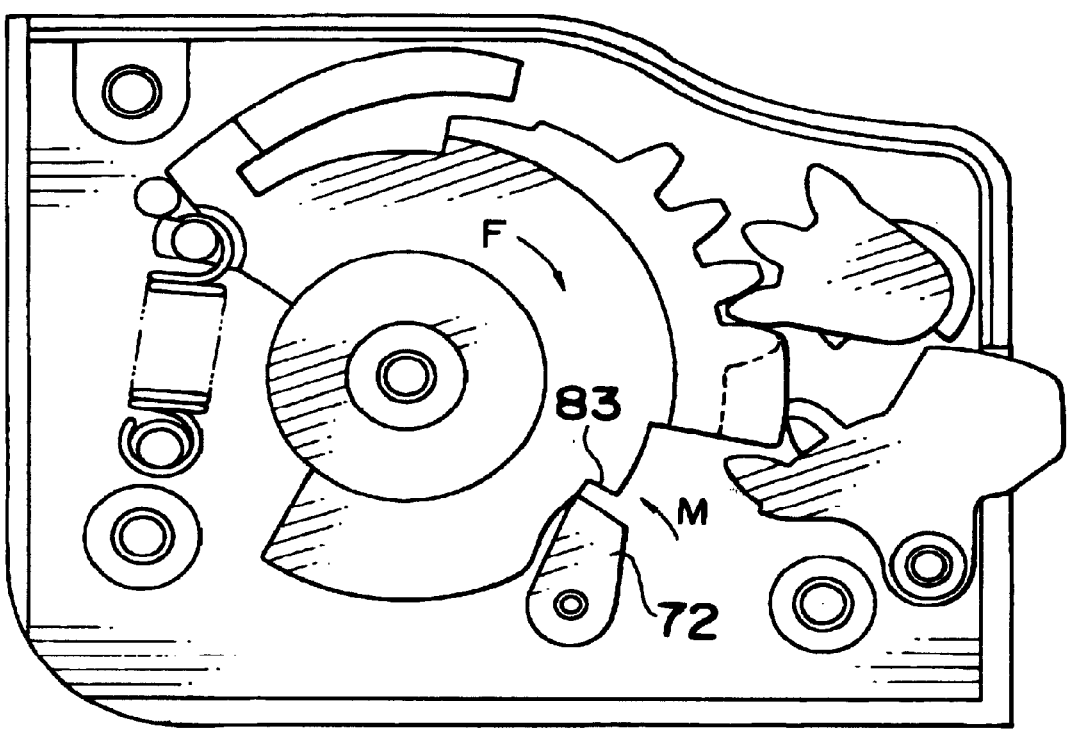
FIG. 14 is an explanatory view showing a position of the safety lever in the state of FIG. 13.

FIG. 13 shows a state in which the locking projection 58 contacts the stopper 108, and FIG. 14 shows the lower surface of the base 101, corresponding to the state shown in FIG. 13. As indicated in FIG. 14, because the safety lever 72 is in engagement with the cut-out portion 83 formed on the side surface of the locking gear 80, the locking gear 80 cannot be rotated in the "F" direction even though the unlocking operation member 90 is operated.

Next, it is explained about a situation in which the film fed out from the cartridge 1 is rewound inside the cartridge 1, more specifically for example, about a situation in which the cartridge is taken out from the camera body after all frames of the film have been photographed, or about a situation in which the cartridge is once taken out from the camera body after some of the frames of the film have been photographed.

In these situations, a driving force opposite to the driving force transmitted at time of film winding (i.e. at time of feeding the film out from the cartridge) is transmitted from the driving motor "M" to the spool 113 of the cartridge 1. Accordingly, the spool engaging gear 30 rotates in the direction opposite to the "H" direction. With an operation and function which are similar to those at time of film winding, the planetary carrier 50 rotates in the direction opposite to the "J" direction until the locking portion 57 contacts the stopper 107. As a result, the safety gear 70 connected with the planetary carrier 50 through the intermediate gear 60 rotates in the direction opposite to the "L" direction, and the safety lever 72 rotates in the direction opposite to the "M" direction. Therefore, the safety lever 72 disengages from the cut-out portion 83, and the safety mechanism section returns to the unlocking possible state as shown in FIG. 11. When the film is further rewound into the cartridge 1, the planetary gear 40 continues rotating on the supporting shaft 52 against the frictional force exerting therebetween.

When the film is entirely rewound inside the cartridge 1, the safety mechanism section is in the unlocking possible state as shown in FIG. 11. Therefore, the cartridge cover 100 can be opened by manually operating the unlocking operation member 90 as previously explained.

As apparent from the description of the safety mechanism section, when the planetary carrier 50 acting as the interlocking rotation member is located at the position (First position) shown in FIG. 11, the safety lever 72 is away from the cut-out portion 83 formed on the side surface of the locking gear 80 of the locking mechanism section, thus permitting the rotation of the locking gear 80. On the other hand, when the planetary carrier 50 is located at the position (second position) shown in FIG. 13, the safety lever 72 engages the cut-out portion 83 formed on the side surface of the locking gear 80, thus fixing the locking gear 80 at the locking position. With this state, it is impossible to manually operate the unlocking operation member 90.

As explained above, the first and second positions of the planetary carrier 50 are changed according to the change in the movement direction of the film from the winding direction to the rewinding direction, or from the rewinding direction to the winding direction.

That is, when the film starts to be wound from a state in which the planetary carrier 50 is in the first position at which the locking portion 57 is in contact with the stopper 107, the planetary carrier 50 is urged (namely, driven) towards the second position from the first position in unison with this movement of the film. Therefore, the planetary carrier 50 continues rotating until the locking projection 58 contacts the stopper 108. Even after the planetary carrier 50 reaches the second position as shown in FIG. 13 and its rotation is stopped, it is possible that the film can be continuously pulled out (i.e. continuously wound, or fed forward).

Then, the planetary carrier 50 is urged (namely, driven) from the second position as shown in FIG. 13 to the first position as shown in FIG. 11, in case that the film is rewound into the cartridge 1 (namely, in case that the direction in movement of the film becomes opposite to the direction at time of winding the film) after all the frames of film have been photographed or after some frames thereof have been photographed. Accordingly, the planetary carrier 50 continues rotating towards the first position until the locking portion 57 contacts the stopper 107. And even after the planetary carrier 50 reaches the first position and its rotation is stopped, the film can continuously be rewound in the same direction.

As apparent from the above explanation, the pair of locking projections 57, 58 formed on the planetary carrier 50, and the pair of stoppers 107, 108 erected on the base 101, function as a rotational region limitation mechanism for limiting the rotatable region of the planetary carrier 50 to the region between the first position and the second position.

As described above, according to the embodiment, the switching of the planetary carrier 50 between the first position and the second position (namely, the switching between the unlocking possible state and the unlocking impossible state) is realized by a utilization of the mechanical device which is interlocked with the movement of the film. Therefore, there is no need of a complex control by utilizing a microcomputer.

Also, in case that a safety locking mechanism is arranged on the cartridge cover, which has a high independence from the camera body, and in case that electric signals are transmitted from the side of the camera body to the side of the cartridge cover, it is necessary to provide a particular electric device. Therefore, from this point of view, it is advantageous to control the safety mechanism section of the safety locking mechanism not by such an electric type of control, but by a mechanical type of control.

By the way, in order to prevent a situation in which it is impossible to unlock the cartridge cover 100 from the camera body in case that the cartridge cover 100 is closed with the film cartridge 1 being unloaded inside the camera body, and in case that the safety mechanism section is carelessly operated or actuated for example by a vibration and impulse; namely, in order to prevent a situation in which it is impossible to open the cartridge cover 100 when the user wants to actually set a film cartridge 1 therein, the camera of the embodiment is provided with a mechanism for keeping the safety mechanism unlocked in case that the film cartridge is not loaded inside the camera body. In other words, the camera further comprises a prohibiting mechanism for prohibiting an operation of the safety mechanism when the cartridge chamber is not loaded with the film cartridge 1. This mechanism is explained below with reference to FIGS. 5 and 15.

Figure 15:
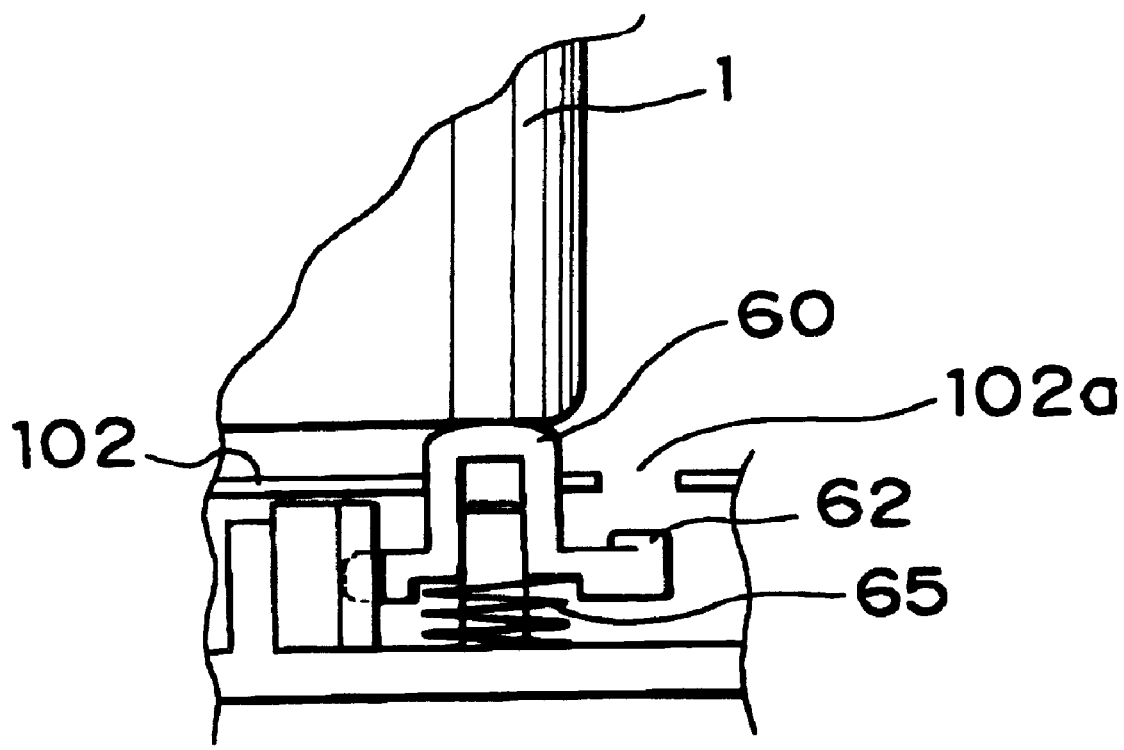
FIG. 15 is a sectional view showing a vicinity of an intermediate gear shown in FIG. 5.

FIG. 15 shows a main part of the intermediate gear 60 and its vicinity as shown in FIG. 5. It is to be noted that FIG. 5 shows a state in which the film cartridge 1 is not loaded; meanwhile, FIG. 15 shows a state in which the film cartridge 1 is loaded.

As shown in FIGS. 5 and 15, the intermediate gear 60 is urged or biased upwards towards the upper cover member 102 by a spring 65. A projection 62 is erected on a body of the intermediate gear 60 in the axial direction thereof. When the cartridge is not in the camera body, the intermediate gear 60 is urged upward by the spring 65, and the projection 62 engages an open portion 102a formed on the upper cover member 102. When the projection 62 of the intermediate gear 60 engages the open portion 102a of the cover member 102, the intermediate gear 60 is prevented from rotating about its axis. This state corresponds to the state before the cartridge 1 is loaded in the camera body in FIG. 11 (FIG. 11 shows the state in which the cover member 102 is removed, and indicates the open portion 102a of the cover member 102 by an imaginary chain line).

Referring to FIG. 11, before the cartridge is loaded inside the camera body, the rotation of the intermediate gear 60 is prohibited. Therefore, the intermediate gear 60 does not rotate even if a driving force is applied thereto from the planetary carrier 50. Accordingly, the safety mechanism section is not operated.

On the other hand, as shown in FIG. 15, when the cartridge 1 is set inside the camera body, the projection 62 of the intermediate gear 60 retreats to the lower side (i.e. withdraws in a direction to the other cover member 103). As a result, the projection 62 thereof is disengaged from the open portion 102a of the cover member 102. With this condition, the intermediate gear 60 receives a driving force from the planetary carrier 50, so that the intermediate gear 60 is able of rotating on its axis, and so that the safety mechanism section is able of function as explained above.

FIG. 13 shows a state in which the cartridge 1 is inside the camera body, and the projection 62 of the intermediate gear 60 is located at a position below the open portion 102a, or at a position behind the cover member 102. As described previously, the intermediate gear 60 never fails to return to the rotation position as shown in FIG. 11 before the film cartridge 1 is taken out from the camera body. Therefore, when the cartridge 1 is taken out from the camera body by opening the cartridge cover 100, the intermediate gear 60 is urged upwards by the spring 65 and engages the open portion 102a formed on the upper cover member 102. Accordingly, the rotation of the intermediate gear 60 is surely prevented until the next cartridge is loaded into the camera body. Hence, a careless operation of the safety mechanism section is surely prevented.

According to the embodiment of the present invention, the safety mechanism section of the embodiment is switched between the unlocking possible state and the unlocking impossible state, as explained above, by selectively making the safety lever 72 engage the locking gear 80 of the locking mechanism section or disengage therefrom. Alternatively, the safety mechanism section of the embodiment can be switched between the unlocking possible state and the unlocking impossible state, by selectively making the safety lever 72 engage the locking lever 10 of the locking mechanism section (or the light-intercepting door operation gear 22) or disengage therefrom.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A camera with a cartridge chamber in which a film cartridge is to be housed, comprising:
   a cover for opening and closing the cartridge chamber;
   a locking mechanism for locking the cover relative to a body of the camera at a position at which the cover closes the cartridge chamber;
   a manual unlocking member separate from and operatively connected to the locking mechanism so as to unlock the cover relative to the body;
   a safety mechanism for permitting and prohibiting an operation of the manual unlocking member, wherein the safety mechanism is provided on an inner side of the cover;
   a driving source for supplying a force to drive the safety mechanism; and
   a transmission mechanism for transmitting the force from the driving source to the safety mechanism via a spool of the film cartridge when the film cartridge is set inside the cartridge chamber.

2. The camera as claimed in claim 1, wherein the locking mechanism comprises a locking part which is movable between a projecting position at which the locking part projects from the cover and a withdrawing position at which the locking part withdraws inside the cover.

3. The camera as claimed in claim 1, wherein the transmission mechanism comprises:
   a driving mechanism which is interlocked with the driving source and which engages one of two edges of the spool of the film cartridge; and
   a driven mechanism which is interlocked with the safety mechanism and which engages the other of said two edges of the spool of the film cartridge.

4. The camera as claimed in claim 3, wherein the safety mechanism is driven so as to permit the operation of the manual unlocking member, when the spool of the film cartridge is rotated in a direction in which a film is rewound inside the film cartridge by the transmission mechanism.

5. The camera as claimed in claim 4, wherein the transmission mechanism further comprises a pair of members which frictionally engage each other, and wherein a rotation of the spool of the film cartridge is permitted during and after an operation of the safety mechanism.

6. The camera as claimed in claim 3, wherein the safety mechanism is driven so as to prohibit the operation of the manual unlocking member, when the spool of the film cartridge is rotated in a direction in which a film is fed out from the film cartridge by the transmission mechanism.

7. The camera as claimed in claim 6, wherein the transmission mechanism further comprises a pair of members which frictionally engage each other, and wherein a rotation of the spool of the film cartridge is permitted during and after an operation of the safety mechanism.

8. The camera as claimed in claim 1, which further comprises a prohibiting mechanism for prohibiting an operation of the safety mechanism when the cartridge chamber is not loaded with the film cartridge.

9. The camera as claimed in claim 8, wherein the prohibiting mechanism comprises a contact member which projects inside the cartridge chamber and which contacts the film cartridge which is set inside the cartridge chamber.

10. The camera as claimed in claim 9, wherein the contact member is a member constituting one of the safety mechanism and the transmission mechanism, and wherein the contact member engages a stationary part of the cover when the cartridge chamber is not loaded with the film cartridge.

11. The camera as claimed in claim 10, wherein the contact member contacts the film cartridge so that the contact member moves and disengages from the stationary part of the cover when the cartridge chamber is loaded with the film cartridge.

12. A camera with a cartridge chamber in which a film cartridge is to be housed, comprising:

a cover for opening and closing the cartridge chamber;

a locking mechanism for locking the cover relative to a body of the camera at a position at which the cover closes the cartridge chamber;

a manual unlocking member separate from and operatively connected to the locking mechanism so as to unlock the cover relative to the body;

a safety mechanism for permitting and prohibiting an operation of the manual unlocking member, wherein the safety mechanism is provided on an inner side of the cover;

a driving source for supplying a force to drive the safety mechanism; and a transmission mechanism for transmitting the force to drive the safety mechanism.

13. The camera as claimed in claim 12, wherein the locking mechanism comprises a locking part which is movable between a projecting position at which the locking part projects from the cover and a withdrawing position at which the locking part withdraws inside the cover.

14. The camera as claimed in claim 12, which further comprises a prohibiting mechanism for prohibiting an operation of the safety mechanism when the cartridge chamber is not loaded with the film cartridge.

15. The camera as claimed in claim 14, wherein the prohibiting mechanism comprises a contact member which projects inside the cartridge chamber and which contacts the film cartridge which is set inside the cartridge chamber.

16. The camera as claimed in claim 15, wherein the contact member is a member constituting one of the safety mechanism and the transmission mechanism, and wherein the contact member engages a stationary part of the cover when the cartridge chamber is not loaded with the film cartridge.

17. The camera as claimed in claim 16, wherein the contact member contacts the film cartridge so that the contact member moves and disengages from the stationary part of the cover when the cartridge chamber is loaded with the film cartridge.

* * * * *